United States Patent [19]
Osman

[11] Patent Number: 6,076,884
[45] Date of Patent: Jun. 20, 2000

[54] TRUCK CAB CONVERSION PANEL

[76] Inventor: William R. Osman, R.R. 2, Box 379-0, Sheldon, Mo. 64784

[21] Appl. No.: 09/187,507

[22] Filed: Nov. 6, 1998

[51] Int. Cl.[7] ...................................................... B60P 3/32
[52] U.S. Cl. ................................ 296/190.02; 296/190.08
[58] Field of Search ........................ 296/190.02, 190.08; 180/89.12

[56] References Cited

U.S. PATENT DOCUMENTS

| | | | |
|---|---|---|---|
| 2,816,794 | 12/1957 | Temp | 296/190.08 X |
| 3,339,967 | 9/1967 | Harris | 296/190.08 |
| 3,572,810 | 3/1971 | Arakelian | 296/190.08 X |
| 4,775,179 | 10/1988 | Riggs | 296/190.02 X |
| 5,083,834 | 1/1992 | Moffatt et al. | 296/190.02 X |
| 5,159,746 | 11/1992 | Saggese | 296/190.08 X |
| 5,560,673 | 10/1996 | Angelo | 296/190.02 X |

FOREIGN PATENT DOCUMENTS

| | | | |
|---|---|---|---|
| 424289 | 4/1991 | European Pat. Off. | 296/190.02 |
| 263423 | 2/1970 | U.S.S.R. | 296/190.08 |

*Primary Examiner*—Joseph D. Pape
*Attorney, Agent, or Firm*—Zarley, McKee, Thomte, Voorhees & Sease

[57] ABSTRACT

A conversion panel is provided for converting a sleeper truck cab into a day cab. The panel is a one-piece fiberglass construction having a back wall, opposite side walls, and a top wall. After the sleeping compartment is removed from the cab, the panel is mounted onto the cab using rivets. A sealant is provided between the panel and the cab to prevent water leakage.

18 Claims, 3 Drawing Sheets

TRUCK CAB CONVERSION PANEL

BACKGROUND OF THE INVENTION

Over-the-road truck cabs having a sleeping compartment are well known. It is common to manufacture the truck cab and sleeping compartment as an integral unit. There is a market for over-the-road truck cabs which have worn out the useful life of the sleeping compartment. Such used truck cabs are often converted into a day or work cab by removing the sleeping compartment and covering the opening created in the back of the cab. However, such conversion of sleeper truck cabs into day cabs typically involves numerous components, such as multiple panels and braces which must be assembled to convert the sleeper cab to a day cab. The assembly of such multiple component conversions is time consuming, and the manufacture of the individual components is expensive.

Another known method for converting the sleeper cab into a day cab is cutting the panels of the sleeper down to size and riveting the modified panels back to the truck cab. Again, such cutting, sizing and re-assembly is expensive and time consuming.

Therefore, a primary objective of the present invention is the provision of a retrofit panel for converting a sleeper truck cab into a day cab.

Another objective of the present invention is a provision of a light weight panel which can be quickly and easily installed on a truck cab after a sleeping compartment has been removed from the cab.

A further objective of the present invention is the provision of a one-piece panel for converting a sleeper truck cab into a day cab which is economic to manufacture and durable in use.

A further objective of the present invention is a quick and easy method for converting an over-the-road sleeper truck cab into day cab.

These and other objectives will become apparent from the following description of the invention.

SUMMARY OF THE INVENTION

A one-piece fiberglass panel is provided for a retrofit conversion of a sleeper truck cab into a day cab. The panel includes a back wall, opposite side walls extending forwardly from the back wall, and a top wall extending forwardly from the back wall. After the sleeping compartment is cut away or otherwise removed from the sleeper truck cab so as to form an opening in the back portion of the cab, the panel is quickly and easily installed over the opening using rivets, so as to create a day cab. Wooden or steel reinforcement members are provided in the panel for structural integrity. In one embodiment, the panel includes an extended top wall which forms a roof for the day cab. A sealant material is applied between the panel and the cab to prevent water leakage into the cab.

DETAILED DESCRIPTION OF THE DRAWINGS

Figure 1:
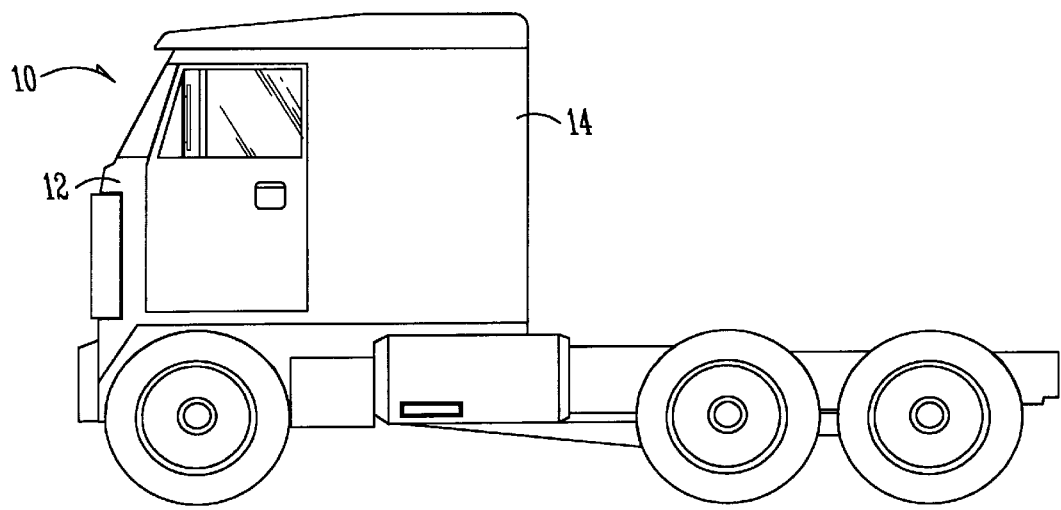
FIG. 1 is a side elevation view of an over-the-road truck cab having an integral sleeper.

As seen in FIG. 1, an over-the-road truck is generally designated by the reference 10. The truck 10 includes a cab 12 with an integral sleeper or sleeping compartment 14.

Figure 2:
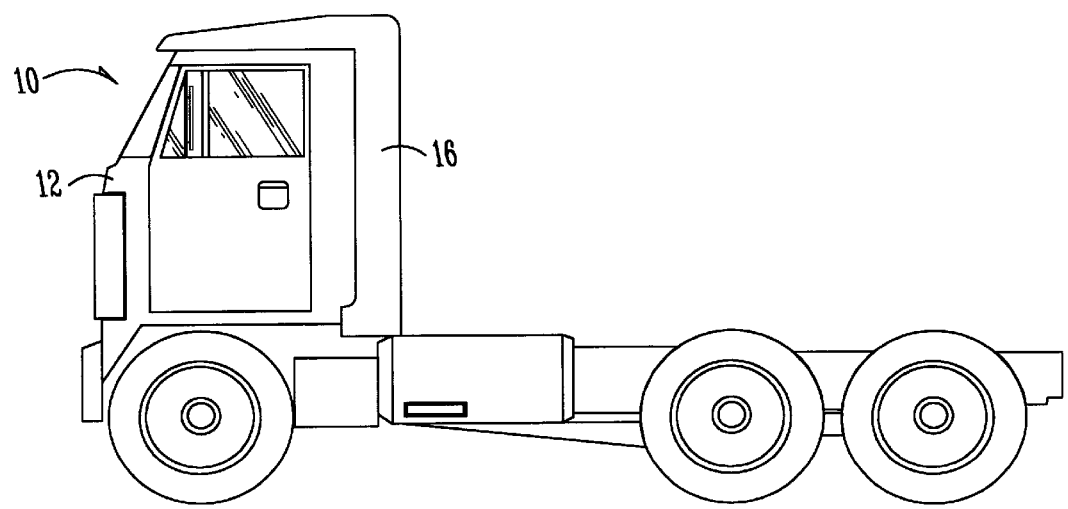
FIG. 2 is a side elevation view of the truck cab of FIG. 1 having the sleeping compartment removed and the panel of the present invention installed so as to form a day cab.
Figure 3:
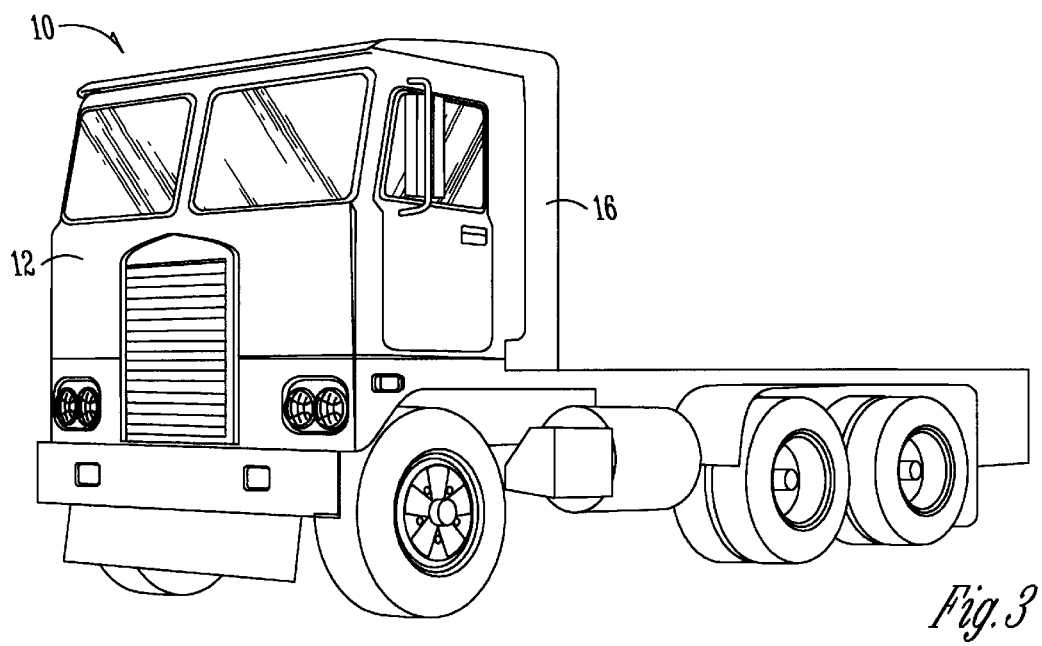
FIG. 3 is a front perspective view of a converted day cab using the panel of the present invention.

FIG. 2 shows the truck 10 after the sleeper 14 has been removed and a conversion panel 16 in accordance with the present invention has been installed so as to create a day cab.

Figure 4:
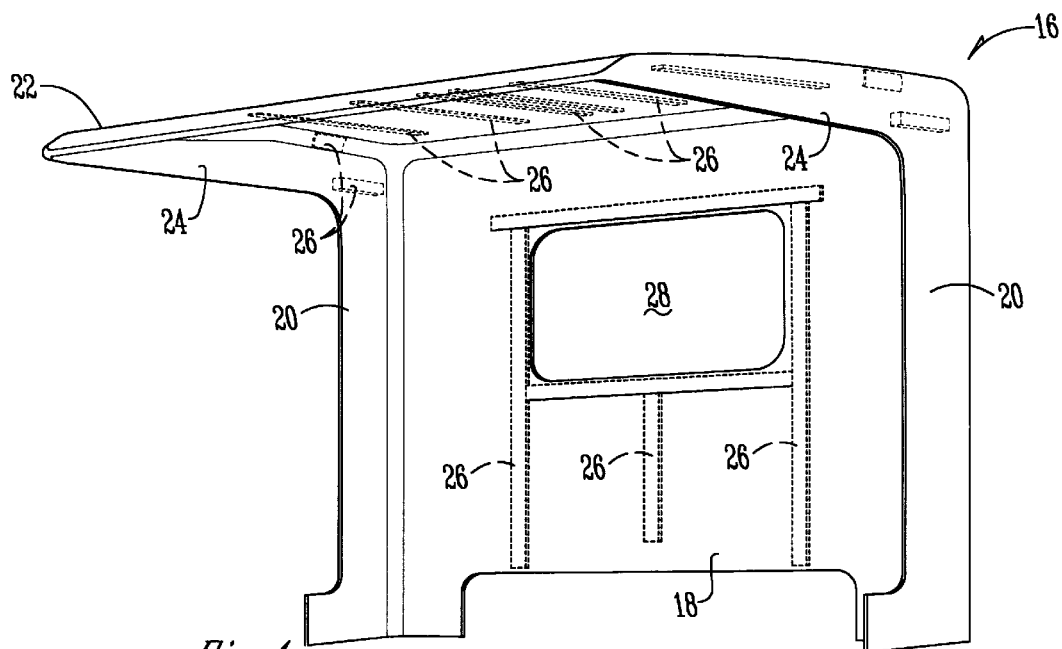
FIG. 4 is a perspective view of the conversion panel of the present invention.

As best seen in FIG. 4, the conversion panel 16 is a one-piece construction. Preferably, the panel 16 is molded so as to have a shape to matingly fit the truck cab 12 after the sleeper 14 is removed. The panel 16 is preferably made from fiberglass. Alternatively, the panel 16 may be made from plastic or other materials.

The panel 16 includes a back wall 18, opposite side walls 20 extending forwardly from the back wall 18, and a top wall 22 extending forwardly from the back wall 18. In the embodiment shown in FIG. 4, the top wall 22 extends substantially beyond the side walls 20 so as to form a roof which extends over the cab 12. The top wall 22 includes downwardly extending side portions 24. The depth or width of the sidewalls 20 may vary. For example, the size of the sidewall 20 may be increased to provide additional room in the truck cab 12 to set the driver's seat back further for a driver with long legs.

Reinforcement members or braces 26 are provided in the panel 16 for strength and structural integrity. The braces 26 may be constructed of wood, steel, expanded steel, or other suitable material. The braces 26 are sandwiched between layers of fiberglass. In a plastic construction, the braces 26 are embedded in the plastic. Preferably, a window 28 is also provided in the back wall 18 of the panel 16.

Figure 5:
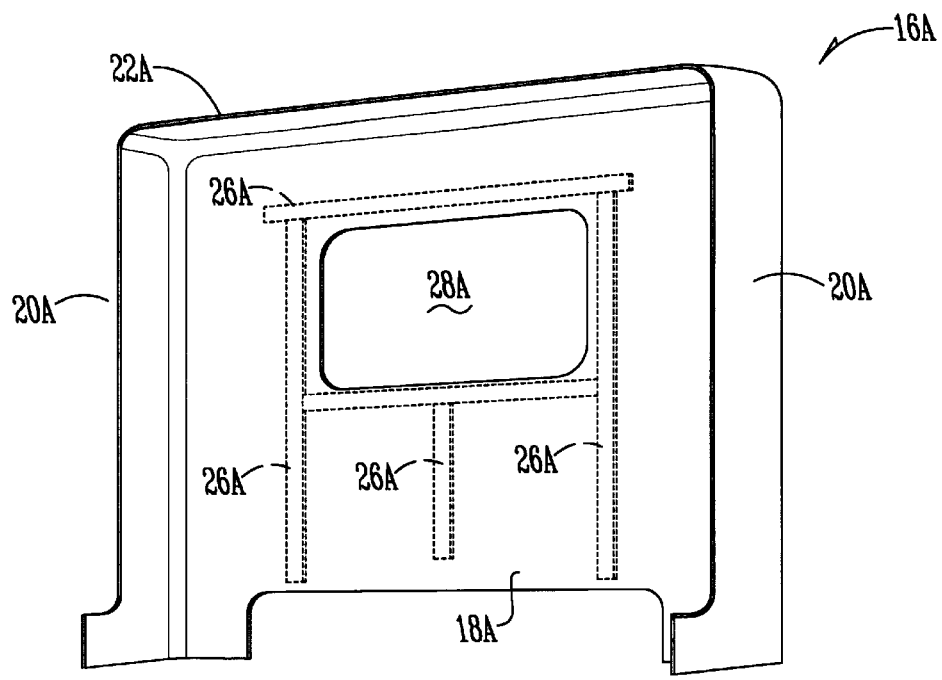
FIG. 5 is a perspective view of an alternative embodiment of the conversion panel.
Figure 6:
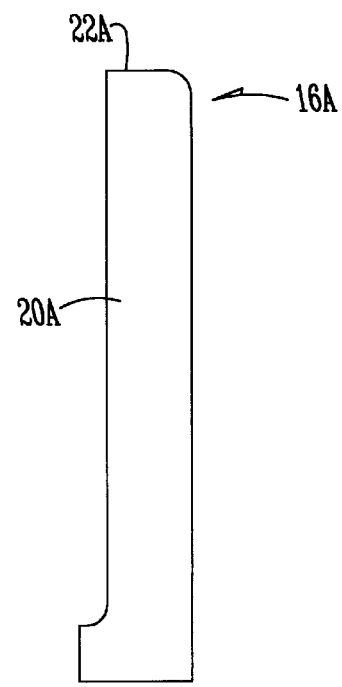
FIG. 6 is a side elevation view of the conversion panel shown in FIG. 5.

An alternative embodiment panel 16A is shown in FIG. 5. The panel 16A has the same basic construction as the panel 16, except that the top wall 22A extends approximately the same distance from the back wall 18A as the side walls 20A. The panel 16A also includes braces 26A and a window 28A.

The method of converting the truck cab shown in FIG. 1 to the truck cab shown in FIG. 2 includes the step of removing the sleeper compartment 14 so as to form an opening in the back of the cab 12. A portion of the cab roof may also be removed with the sleeper compartment 14, if desired. The panel 16 or 16A is then installed over the opening and secured to the cab 12 by rivets or other conventional securement means. A sealant material may be applied at the interface between the panel 16 or 16A and the cab 12 so as to prevent water from leaking into the cab. The one-piece construction of the panels 16 or 16A permits quick and easy installation on the truck cab 12.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A conversion panel for converting an integral sleeper truck cab having a sleeping compartment to a day cab after removal of the sleeping compartment, comprising:

a back wall;

opposite side walls extending forwardly from the back wall and terminating in a forwardly extending edge adapted to matingling overlap rearwardly extending edges on sidewalls of the cab;

a top wall extending forwardly from the back wall;

reinforcement braces formed in the back wall; and the back wall, side walls, and top wall having a one-piece construction.

2. The panel of claim 1 wherein the back wall, side walls and top wall are made of fiberglass.

3. The panel of claim 1 wherein the back, side and top walls are molded in a shape to matingly fit onto the truck cab after removal of the sleeping compartment.

4. The panel of claim 1 further comprising reinforcement braces formed in the top wall.

5. The panel of claim 1 further comprising a window in the back wall.

6. The panel of claim 1 wherein the top wall extends forwardly substantially farther than the side walls to define a roof.

7. The panel of claim 6 wherein the roof includes opposite downwardly extending side portions.

8. The panel of claim 1 wherein the top wall extends forwardly substantially the same distance as the side walls.

9. A method of converting an over-the-road truck cab having a roof, opposite side walls, and a back portion with an integral sleeper into a day truck cab, comprising:

cutting the integral sleeper from the truck cab so as to form an opening extending across the back portion of the truck cab;

installing a one-piece panel over the opening;

securing the panel to the roof and side walls of the truck cab.

10. The method of claim 9 wherein the panel is secured with rivets.

11. The method of claim 9 further comprising removing a portion of the roof, the panel also extending over the removed roof portion.

12. The method of claim 9 further comprising applying a sealing material between the panel and the cab to prevent water leakage into the cab.

13. A truck day cab converted from an integral sleeper cab with a sleeping compartment, comprising:

a forward cab portion with a top wall and side walls and a rear opening formed by cutting the sleeping compartment from the integral sleeper cab; and a rear panel mounted over the opening and being secured to the side walls of the forward cab portion.

14. The day cab of claim 13 wherein the rear panel includes a back wall, side walls and a top wall having a one-piece construction.

15. The day cab of claim 13 wherein the rear panel is fiberglass.

16. The day cab of claim 15 wherein the rear panel includes reinforcing members formed in the fiberglass.

17. The day cab of claim 13 wherein the rear opening is defined by rearwardly extending edges of the side walls and top wall.

18. The day cab of claim 17 wherein the rear panel overlaps the rearwardly extending edges of the side walls and top wall of the forward cab portion.

\* \* \* \* \*